United States Patent [19]

Baumann

[11] Patent Number: 5,554,199
[45] Date of Patent: Sep. 10, 1996

[54] DYEING PROCESS AND AUXILIARY

[75] Inventor: Hans-Peter Baumann, Ettingen, Switzerland

[73] Assignee: Sandoz Ltd., Basel, Switzerland

[21] Appl. No.: 340,924

[22] Filed: Nov. 17, 1994

[30] Foreign Application Priority Data

Nov. 19, 1993 [DE] Germany .......................... 43 39 473.6

[51] Int. Cl.⁶ .......................... C07C 309/42; D06P 1/56; D06P 3/66
[52] U.S. Cl. .......................... 8/543; 8/557; 8/578; 8/584; 8/587; 8/594; 8/602; 8/610; 8/630; 8/918; 8/589
[58] Field of Search .......................... 8/543–549, 557, 8/918, 921, 610, 578, 584, 587, 589, 594, 602, 610, 630

[56] References Cited

U.S. PATENT DOCUMENTS

| | | | |
|---|---|---|---|
| 4,150,944 | 4/1979 | Würmli . | |
| 4,202,838 | 5/1980 | Lauton et al. | 260/505 |
| 4,247,293 | 1/1981 | Würmli | 8/94.24 |
| 4,384,868 | 5/1983 | Sunami et al. | 8/524 |
| 5,186,846 | 2/1993 | Brueckmann et al. | 252/8.7 |
| 5,207,802 | 5/1993 | Baumann | 8/557 |
| 5,240,465 | 8/1993 | Palacin | 8/543 |

FOREIGN PATENT DOCUMENTS

| | | |
|---|---|---|
| 2348938 | 11/1977 | France . |
| 676979 | 5/1939 | Germany . |
| 2937907 | 4/1980 | Germany . |
| 3110411 | 1/1982 | Germany . |
| 3230769 | 4/1983 | Germany . |
| 3209533 | 9/1990 | Germany . |
| 4026255 | 2/1991 | Germany . |
| 4118367 | 12/1991 | Germany . |
| 4018873 | 12/1991 | Germany . |
| 500752 | 9/1976 | U.S.S.R. . |
| 956666 | 10/1982 | U.S.S.R. . |
| 1447665 | 8/1976 | United Kingdom . |
| 1594296 | 7/1981 | United Kingdom . |
| 2244724 | 12/1991 | United Kingdom . |

OTHER PUBLICATIONS

Search Report—Gt Bt for GB 9423017.4, report dated 7 Feb. 1995.

*Primary Examiner*—Margaret Einsmann
*Attorney, Agent, or Firm*—Robert S. Honor; Carl W. Battle; Hesna J. Pfeiffer

[57] ABSTRACT

Dyeing of cellulosic substrates with reactive dyes in the presence of at least 20 g/l of sodium chloride, employing auxiliaries (E) of levelling activity, which are methylene-bridge-containing and sulpho-group-containing aromatic compounds, obtainable by condensation of defined sulphonation products with formaldehyde resp. formaldehyde-yielding compounds and optionally salt formation; (E)-contaning compositions that further contain at least one hydrotrope (H) and/or at least one sequestering agent (Q); and novel condensation products.

10 Claims, No Drawings

DYEING PROCESS AND AUXILIARY

In the dyeing of cellulosic substrates with reactive dyes, in particular by exhaustion methods, the procedure is, in general, carried out in the presence of a certain amount of salt, e.g. sodium sulphate or sodium chloride, as the salt favours the take-up of the reactive dye on the fibre; for fixation there is then also added and alkali. The kind and manner of addition of salt and alkali has a substantial influence on the levelness and reproducibility of the dyeings. Mostly the required amount of salt is added to the dye-bath before the addition of the dye, which, however, often causes a too quick adsorption of the dye on the substrate and, thus, leads to unlevelnesses of the dyeings. An optimum distribution of the dye may be achieved, e.g. by metered addition of salt to the dye-containing dye-bath. By this method, however, due to the addition of the required amount of salt in dissolved form, even if the solution is very concentrated the dye-bath will necessarily become too diluted. The addition of salt in solid form is very time consuming and personnel-encumbering. It has, thus, been proposed in DE-A 41 18 367 which is equivalent to U.S. Pat. No. 5,240,465 to employ certain optionally substituted sulpho-group-containing diphenylether-oligosulphones, in particular sulpho-group-containing ditolylether-oligosulphones, as levelling agents in the presence of salt principally of sodium sulphate. With these oligosulphones there may be achieved very level dyeings. Nowadays there is the trend to employ in the dyeing with reactive dyes sodium chloride instead of the hitherto mostly employed sodium sulphate, be it for economic reasons, be it because of the irregular solubility behaviour of sodium sulphate depending on its degree of hydration and on the temperature increase. It has been observed that at higher sodium chloride concentrations, as occur in the dyeing with reactive dyes, e.g. 60 g/l or more, the mentioned oligosulphones tend, especially at higher temperature, to destabilize, which may lead to troubles (e.g. precipitation and/or deposit in parts of the assembly with corresponding loss in active substance and consequently in the aspect of the dyed goods) in these dyeing procedures.

It has now been found that the below defined products (E) of the condensation of sulphonation-products of defined aprotic, aromatic compounds with formaldehyde, to give —$CH_2$-bridges, and optionally salt formation, are of surprisingly good stability in the dyeing with reactive dyes at high sodium chloride concentrations, as defined below, and also at elevated dyeing temperatures, while displaying an outstanding levelling activity.

The invention relates to the respective dyeing-process using the defined auxiliaries (E), to the new condensation products and their production and use, and to certain (E)-containing levelling agents compositions.

The invention, thus, provides a process for the dyeing of cellulose-containing substrates with reactive dyes (R) in aqueous liquor, in the presence of sodium chloride, wherein the dyeing is carried out in the presence of an auxiliary (E), which is a methylene-bridge-containing and sulpho-group-containing aromatic product or mixture of products, that is obtainable by sulphonation of (a) at least one aromatic hydrocarbon compound with 9 to 18 carbon atoms, to introduce on average at least 1.1 sulpho groups per molecule of (a), and of (b) at least one optionally alkyl substituted diphenyl(thio)ether, to introduce on average at least 1.1 sulpho groups per molecule of (b), and condensation of the sulphonation products of (a) and of (b) with (c) formaldehyde or a formaldehyde-yielding compound in acidic medium, and optionally salt formation, and the sodium chloride content of the dyeing liquor is $\geq 20$ g/l.

As (a) come into consideration principally mono- or bicyclic compounds, preferably of the benzene or naphthalene series, optionally bearing one or more low-molecular alkyl radicals as substituents.

As (a) are especially suitable:

($a_1$) compounds of the formula

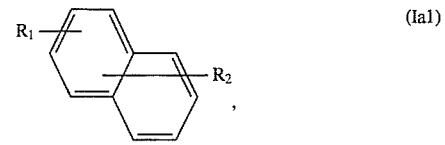

(Ia1)

wherein
$R_1$ signifies hydrogen or $C_{1-4}$-alkyl
and
$R_2$ signifies hydrogen or $C_{1-4}$-alkyl
and ($a_2$) benzenes that are substituted with alkyl and/or a condensed homocyclic ring, in which the sum of the total carbon atoms in the molecule is in the range of 9 to 14, with the proviso that the condensed ring contains at least one carbon that is not linked by double bonds, In the alkyl-substituted benzenes (a2) the single alkyl groups contain preferably 1 to 4 carbon atoms; the substituted benzenes (a2) are advantageously mono-, di-, tri- and/or tetraalkyl-substituted benzenes, or bicyclic compounds; the sum of the total carbon atoms in the molecule (a2) is preferably in the range of 9–12.

The preferred among the compounds ($a_2$) may be represented by the following average formula

(Ia2)

in which
x signifies a number from 1 to 4
and each
$R_3$, independently from each other, signifies $C_{1-4}$-alkyl or, if x=2–4, two vicinal $R_3$ together signify a bivalent saturated or monoethylenically unsaturated $C_{3-8}$-hydrocarbon radical, required for the formation of a condensed 5 or 6-membered homocycle, with the proviso that the sum of the number or carbon atoms in the total x radicals $R_3$ is 3 to 8, preferably 3 to 6.

As (b) are suitable especially compounds of the formula

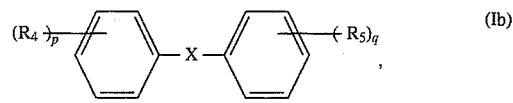

(Ib)

in which
X signifies oxygen or sulphur, each of $R_4$ and $R_5$, independently signifies $C_{1-4}$alkyl
and each of p and q, independently, signifies 0, 1 or 2.

As alkyl groups with 1 to 4 carbon atoms in (a) and (b), in particular in the significance of $R_1$, $R_2$, $R_3$, $R_4$ and $R_5$, come into consideration all possible representatives, specifically methyl, ethyl, n-propyl, isopropyl, n-butyl, isobutyl, sec.-butyl and t.butyl.

The symbols $R_1$ and $R_2$ may have the same or different significances. The alkyl radicals $R_1$ or/and $R_2$ may be in any of the respective positions α and β. Among the dialkylsubstituted naphthalenes of formula (Ia1) (e.g. diisopropylnapthalenes) come into consideration all possible positional isomers, in particular the corresponding 1,3-, 1,4-, 1,5-, 1,6-, 1,7-, 2,6- and 2,7 -dialkylsubstituted naphthalenes. There may be employed single compounds or mixtures. According to one preferred feature $R_1$ and $R_2$ signify both hydrogen, i.e. among the compounds of formula (Ia1) a preferred compound is unsubstituted napthalene. There may also be employed technical grade naphthalenes, in particular in the form of aromatic hydrocarbon mixtures that contain naphthalene and/or optionally methylnaphthalenes as main component and are substantially free of $C_{6-9}$-hydrocarbons.

If in formula (Ia2) x=2 to 4, the respective x radicals $R_3$ may have the same or different significances. If two vicinal $R_3$ are joined to each other to form, together with the two carbons of the benzene ring to which they are linked, a homocycle, the respective compounds are advantageously indanes, indenes, dialine or tetraline, in particular optionally methyl- or ethyl-substituted indanes or indenes. As ($a_2$) there may be employed unitary alkyl-substituted benzenes or also technical grade mixtures, e.g. those in which the hydrocarbons contain on average 10 to 11 carbon atoms, in particular corresponding distillation fractions as commercially available, e.g. containing di-, tri- and/or tetramethylbenzenes, ethyl-methyl-benzenes, ethyl-dimethyl-benzenes, n- or iso-propyl-benzenes, methyl-n- or -iso-propyl-benzenes, diethylbenzenes, indanes, indenes, methyl- or ethyl-indanes or -indenes and/or $C_{11}$-aromatics (alkylbenzenes, diaromatics), e.g. "SHELLSOL AB".

In the compounds of formula (Ib) X signifies preferably oxygen.

Among the alkyl radicals in the significance of $R_4$ and $R_5$ are preferred the lower molecular representatives, in particular ethyl and before all methyl. If p and/or q signify 1 or 2, the respective alkyl groups may be in any of the positions ortho, meta and para to X, in particular to the oxygen atom. As monosubstituted diphenyl(thio)ether, in which only one of p and q signifies 1, while the other signifies 0, there may be mentioned the respective 2-, 3- or 4-alkyldiphenyl(thio)ether, mainly the 2-, 3- or 4-methyldiphenyl(thio)ether, as well as technical grade mixtures of these compounds. Of the compounds, in which each of p and q signifies 1, there may be mentioned the single positional isomers 2,2', 2,3', 2,4', 3,3', 3,4' and 4,4' and also mixtures, in particular technical grade mixtures of these isomers; among these are preferred ditolylether and ditolylether mixtures, in particular technical grade ditolylether mixtures. If p or q signify 2 the two alkyl radicals may have different significances or preferably equal significances and be positioned in any two positions of the phenyl radical (2,3; 2,4; 2,5; 2,6; 3,4; 3,5). Particularly worth mention are the respective dixylylethers and dixylylether mixtures, in particular technical grade dixylylether mixtures. Also worth mention are mixed ethers, in particular phenyl-tolyl-ethers, phenyl-xylyl-ethers and tolyl-xylyl-ethers. Among the mentioned ethers those are preferred, in which p=0 or 1 and q=0 or 1, in particular p=1 and q=1, principally ditolylether.

The compounds to be sulphonated are advantageously at least one compound ($a_1$) and at least one compound (b), or at least one compound ($a_2$) and at least one compound (b), or at least one compound ($a_1$), at least one compound ($a_2$) and at least one compound (b).

The components to be sulphonated may be sulphonated each separately or in admixture with each other or also stepwise (starting with the more inert component and adding the more reactive component at a stage as suitable for the desired degree of sulphonation). The sulphonation of the compounds (a) and (b) may take place under sulphonation conditions conventional per se, e.g. using oleum, 100% sulphuric acid, concentrated sulphuric acid or chlorosulphonic acid. The sulphonation may take place e.g. in the temperature range from room temperature (=20° C.) to 160° C., preferably 70° to 160° C., optionally under nitrogen. When sulphonating with 100% or concentrated sulphuric acid (e.g. with $H_2SO_4$ to $H_2SO_4.H_2O$) sulphonation is advantageously carried out under a nitrogen blanket. The sulphonation is expediently carried out under such conditions that per molecule of (a) or (b), in particular of the formula (Ia1), (Ia2) or (Ib) there are introduced on average 1.1 to 2, advantageously 1.2 to 2, with particular preference 1.4 to 1.8 sulpho groups, using the amount of sulphonating agent suitable therefor. Advantageously there are employed 1.2 to 2.5 moles, preferably 1.4 to 2.3 moles, with particular preference 1.5 to 2.2 moles of the sulphonating agent per mole of starting product (a) or (b) or mixture of the respective compounds.

The sulphonation products of ($a_1$) may, in particular, be represented by the following average formula

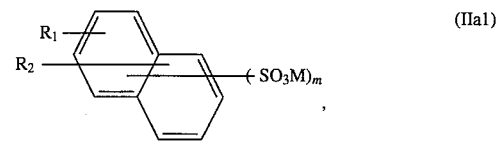
(IIa1)

in which m signifies 1.1 to 2, preferably 1.2 to 2,
and

M signifies hydrogen or a cation.

The sulphonation products of ($a_2$) may in particular be represented by the following average formula

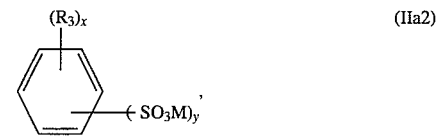
(IIa2)

in which y signifies 1.1 to 2, preferably 1.2 to 2.

The sulphonation products of (b) may be represented in particular by the following average formula

(IIb)

in which n signifies 1.1 to 2, preferably 1.2 to 2.

The indexes m, y and n represent the above sulphonation degree and are advantageously each in the range of 1.4 to 1.8.

If desired, the sulphonation mixture may be allowed to continue to react for a certain time at elevated temperature, e g. at 140° to 160° C., so that a part of the sulphonic acid groups (e.g. 5 to 30 val-%, in particular 5 to 25 val-%) are condensed to sulphone bridges, and consequently in addition to the compounds of formulae (IIa1), (IIa2) and/or (IIb), also sulpho-group-containing sulphones thereof are present. 1 val of sulphonic acid=1 mole of sulphonic acid divided by the average number of suphonic acid groups per molecule.

The sulphonation products of (a) and (b), in particular the compounds of formulae (IIa1), (IIa2) and (IIb) and optionally sulpho-group-containing sulphones thereof are preferably employed in the form of their free acids (i.e. wherein M signifies hydrogen) since the reaction with (c) takes place under acidic conditions.

For the production of (g) the products (a) and (b) are advantageously employed in a molar ratio (a)/(b) in the range of 10:90 to 90:10, preferably 30:70 to 80:20, in particular 40:60 to 65:35.

If as (a) there are employed products $(a_1)$ and $(a_2)$ these are employed advantageously in a molar ratio $(a_1)/(a_2)$ in the range of 2:98 to 98:2, preferably 5:95 to 95:5, in particular 5:95 to 80:20.

If as products $(a_1)$ there are employed unsubstituted naphthalene and alkyl-substituted naphthalene the molar ratio of naphthalene to alkyl-substituted naphthalene is e.g. in the range of 2:98 to 98:2, advangageously in the range of 10:90 to 90:10, preferably 30:70 to 80:20, in particular 40:60 to 65:35.

As component (c) there may be employed free formaldehyde or a formaldehyde-yielding compound, e.g. melamine or preferably paraformaldehyde. The molar ratio of the total components [(a)+(b)] to (c) is advantageously chosen so that there may be formed simple to oligomeric condensation products of the sulphonation products. In these condensation products the respective radicals of the sulphonation products of (a) and (b), in particular those of the compounds of formulae (IIa1), (IIa2) resp. (IIb) and optionally sulphones thereof, are linked to each other mainly over aromatically bound methylene bridges.

Substantially the auxiliaries (E) deriving from the compounds of formulae (Ia1), (Ia2) resp. (Ib) may be represented as such products as contain one or more repeating units of the respective average formula

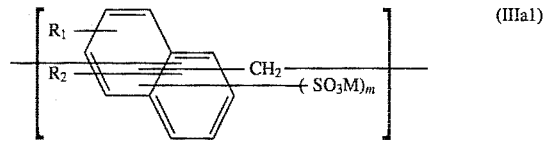

and/or

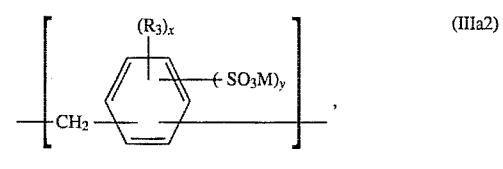

and

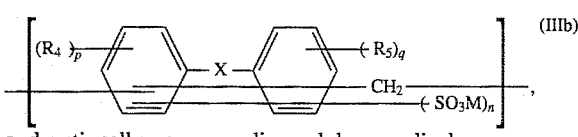

and optionally corresponding sulphone radicals.

In the formulae (IIIa1), (IIIa2) and (IIIb) the free bond shown without substituent and pendant at the aromatic nucleus is either linked over a methylene bridge to a further aromatic radical (IIIa1), (IIIa2) or (IIIb) or [if (IIIa1), (IIIa2) or (IIIb) represent a terminal group] is linked directly to a hydrogen atom. The open bond pendant at the methylene group is linked to the aromatic nucleus of a further radical of formula (IIIa1), (IIIa2) or (IIIb).

The molar ratio of the sulphonation products to (c) is advantageously chosen so that per mole of total starting products (a) and (b) there are employed 0.35 to 0.9 moles, preferably 0.45 to 0.7 moles, in particular 0.5 to 0.6 moles, of formaldehyde or the corresponding amount of a formaldehyde-yielding compound.

The reaction with (c) takes place advantageously at temperatures in the range of from 50° to 110° C. in strongly acidic medium, e.g. at pH values <3, preferably below 1. With particular advantage this reaction is carried out sequentially to the sulphonation in the sulphuric-acid-containing acidic medium. Preferably the reaction with (c) takes place in aqueous acidic medium, for which component (c) may be added in hydrodiluted form and/or the sulphuric medium resulting from sulphonation may be diluted with water up to a water content of advantageously 10 to 50% by weight.

After conclusion of the reaction the obtained sulphonic acids [in particular those in which in formulae (IIIa1), (IIIa2) resp. (IIIb) M signifies hydrogen] may be converted to the corresponding salt form [in particular wherein in formulae (IIIa1), (IIIa2) resp. (IIIb) M signifies a cation] by reaction with a suitable base or the salt of a strong base with a weak acid. As cations M come principally into consideration colourless cations, preferably alkali metal cations (in particular lithium, sodium, potassium), alkaline earth metal cations (in particular magnesium) and/or ammonium cations (in particular unsubstituted ammonium, morpholinium or ammonium substituted with ($C_{1-4}$-alkyl and/or $C_{2-3}$-hydroxyalkyl, e.g. mono-, di- or triethanolammonium or mono-, di- or triisopropanolammonium) which may be introduced by treatment of the sulphonic acids with corresponding bases or their salts of weak acids, e.g. with alkali metal hydroxides, carbonates or bicarbonates, magnesium-hydroxide, ammonia or corresponding amines. Among the mentioned cations, alkali metal cations and especially ammonium cations are preferred, in particular unsubstituted ammonium. Advantageously there is employed so much base that the pH of a 10% aqueous composition is in the range of 7 to 10, preferably 7.5 to 9.

The obtained products (g) are—in particular in salt form—readily soluble in water and may be handled so as produced, optionally after adjusting the water content to a dry substance content of e.g. 10 to 70% by weight or they may, if desired, be dried to give dry compositions, e.g. by spray drying or granulating (optionally with addition of granulating auxiliaries).

A particular object of the invention is represented by those products (E), i.e. ($E_1$), that are produced starting from ($a_1$) and (b) and where in at least a part of the employed components ($a_1$) $R_1$ and $R_2$ signify both hydrogen, i.e. wherein a part of the employed starting products of formula (Ia1) is naphthalene, e.g. at least 10 mol-% of the compounds of formula (Ia1), preferably at least 50 mol-% thereof, more preferably wherein the employed starting product of formula (Ia1) is exclusively naphthalene.

A further particular object of the invention is represented by those products (E), i.e. ($E_2$), in which the sulphonation products of (a) and optionally (b) employed for condensation with (c) are partially condensed to sulpho-group-containing sulphones.

The above defined products (E) serve as auxiliaries, in particular as levelling agents, for the dyeing of cellulose-containing substrates with reactive dyes in an aqueous liquor that contains at least 20 g/l of sodium chloride. In these dyeing processes there is advantageously employed at least one sequestering agent (Q) and/or at least one hydrotrope (H).

As sequestering agents (Q) there may be employed products known as sequestering agents; principally come into consideration the following:

(Q$_1$) alkali metal tetraborates, (Q$_2$) (co)poly(meth)acrylic acids, optionally in salt form, (Q$_3$) N-methylene-phosphonic or -carboxylic acids, optionally in salt form, or (Q$_4$) polyhydroxycarboxylic acids, optionally in salt form, or mixtures of two or more of these compounds.

For salt formation of the acids mentioned under (Qhd 2), (Q$_3$) and (Q$_4$) come principally into consideration alkali metal cations (principally lithium, sodium and/or potassium, of which potassium and before all sodium are preferred).

As alkali metal tetraborate (Q$_1$) comes principally into consideration sodium tetraborate (e.g. borax or kernite).

As (Q$_2$) come principally into consideration simple polyacrylic acids in sodium salt form, in particular those with an average molecular weight (weight average) in the range of 1000 to 500,000, advantageously 2000 to 100,000, of which the lower molecular ones, in particular those with an average molecular weight in the range of 2000 to 20,000 are particularly preferred.

As (Q$_3$) come principally into consideration N-methylenephosphonic acids and N-methylenecarboxylic acids, wherein the N is the nitrogen of a low molecular aliphatic polyamine, in particular of an alkylenediamine (e.g. ethylenediamine or propylenediamine) or of a polyalkylenepolyamine (e.g. diethylenetriamine, dipropylenetriamine or triethylenetetramine), e.g. ethylenediamine-tetraacetic acid, diethylenetriamine-pentaacetic acid, ethylenediamine-tetramethylenephosphonic acid and diethylenetriamine-pentamethylenephosphonic acid or further nitrilotriacetic acid and which are preferably in the form of their sodium salts.

As (Q$_4$) come e.g. into consideration saccharide derivatives, e.g. low molecular polyolcarboxylic acids, in particular gluconic acid or glucoheptonic acid, and carboxymethylation products of oligosaccharides or further poly-α-hydroxyacrylic acids (the latter as sodium salt preferably in the molecular weight range from 2000 to 140,000, preferably 2000 to 30,000).

(Q) may be a unitary product, preferably (Q$_1$), or also advantageously a mixture of several products (Q$_1$) to (Q$_4$). Advantageously there are employed mixtures of two or more of the above-mentioned sequestering agents (Q), principally of (Q$_1$) with at least one of the components (Q$_2$), (Q$_3$) and (Q$_4$).

For every 100 parts by weight of (E) there are advantageously employed 5 to 100, preferably 8 to 60 parts by weight of (Q). If (Q) is a mixture of (Q$_1$) with one or more of the components (Q$_2$), (Q$_3$) and (Q$_4$) the weight ratio of (Q$_1$) to the other components (Q) is advantageously in the range of 10:90 to 80:20, preferably in the range of 20:80 to 70:30.

Advantageously, especially when employing (Q), before all if there is used (Q$_1$), there is also employed a hydrotrope (H).

As hydrotropes (H) there may be employed products known per se, principally the following:

(H$_1$) (thio)urea, (H$_2$) aliphatic C$_{3-6}$-polyols with at least three hydroxygroups, or acetic acid partial esters thereof, (H$_3$) mono- or oligo-(C$_{2-4}$-alkylene)-glycols or mono-(C$_{1-4}$-alkyl)-ethers thereof, (H$_4$) dicyanodiamide or (H$_5$) aliphatic lactones or N-alkyl-lactames or mixtures of two or more of these compounds.

As (H$_1$) there is the simplest employed urea.

As (H$_2$) there may be mentioned e.g. glycerine and sorbite, as well as their acetates (in particular partial acetates).

As (H$_3$) there may be employed e.g. mono-, di- or triethyleneglycol and the respective methyl-, ethyl-, propyl- and butyl-monoethers.

As (H$_5$) there may be mentioned e.g. compounds with 4 to 8 carbon atoms. As lactones there may in particular be mentioned butyrolactone, valerolactone and caprolactone. As N-alkyl-lactames there may be mentioned before all the corresponding N-alkyl-substituted pyrrolidones, in which alkyl contains 1 to 4 carbon atoms and signifies preferably methyl.

The auxiliaries (E) are expediently employed in an efficient amount, i.e. in such an amount as to display their activity, in particular levelling activity. Depending on the employed dye, on the substrate to be dyed and on the chosen dyeing conditions, the efficient and the optimum concentration of (E) may vary; in general the concentration of (E) is e.g. in the range of 0.05 to 5 g per liter of liquor, preferably 0.1 to 2 g per liter of liquor. The addition may take place before or after the addition of salt, preferably before the addition of the dye. The amount of the employed sequestering agent (Q) may vary broadly (in part also depending on the hardness of the employed water). Advantageously (Q) is employed in concentrations of 0.005 to 5 g per liter of liquor, preferably 0.01 to 2 g per liter of liquor; the weight ratio of (Q) to (E) is advantageously in the range of 5 to 100, preferably 8 to 60 parts by weight of (Q) for every 100 parts by weight of (E).

The products (E) and (Q) may be added separately to the dye bath or, according to a preferred variant, it is also possible to formulate (E) and (Q) together in the form of a stable, preferably aqueous concentrated composition. For the formulation of such compositions there are advantageously employed hydrotropes (H). For every 100 parts by weight (Q) there are advantageously employed 2 to 100, preferably 5 to 60 parts by weight of (H). In the preferred compositions, in which (Q$_1$) is combined with further components (Q$_2$) and/or (Q$_3$) and/or (Q$_4$), there may be employed correspondingly smaller amounts of (H), e.g. 1 to 20, preferably 2 to 14% by weight, referred to (E).

The preparations containing (E) and (Q) as well as optionally (H) are advantageously formulated in the form of aqueous concentrated compositions, whose dry substance content is advantageously in the range of from 10 to 80, preferably 20 to 70, in particular 25 to 65% by weight.

As reactive dyes (R) come, in general, into consideration any reactive dyes as are known in technique under this designation, e.g. as are defined in the "Colour Index" under the designation "Reactive Dyes" and also described and, in particular, listed therein. Suitable reactive dyes (R) are dyes containing at least one fibre-reactive group, e.g. dyes of the azo, anthraquinone, oxazine, (azo and/or azomethine)metal complex, formazane and phthalocyanine series, before all hydrosoluble dyes, which may be fixed in the temperature range of 20° to 100° C., at pH values in the range of 8 to 12.5, by the exhaustion method. The here preferred reactive dyes contain at least one mono- or dichlorotriazinyl, monofluorotriazinyl, mono- or difluoropyrimidine, fluorochloropyrimidine, dichloroquinoxaline, methylsulphonylchloromethylpyrimidine, or sulphatoethylsulphonyl group, e.g. as are known from the "Colour Index".

As substrates for the process of the invention are suitable in general any fibrous materials that contain optionally modified cellulose, as are dyeable with reactive dyes by the exhaustion method, in particular cellulose (e.g. cotton, linen, hemp, sisal), modified cellulose (e.g. viscose rayon and cellulose acetates) and fibre blends containing such fibres. The fibres may be in any processing form as are conventionally employed for dyeing process with reactive dyes by the exhaustion method, e.g. as threads, filaments, yarn strands, spools, weavings, knittings, felts, tuftings or even half-ready-made and ready-made goods.

As dyeing processes come into consideration exhaustion processes and analogous processes, in which dyeing is carried out in the presence of an efficient amount of added sodium chloride that corresponds to a sodium chloride content of the liquor of at least 20 g/l, essentially exhaustion methods and impregnation methods. Before all come into consideration exhaustion methods; these may be carried out from short or also long liquors, e.g. at liquor-to-goods ratios in the range of from 120:1 to 2:1, principally 60:1 to 4:1; in processes from longer liquor-to-goods ratios the liquor-to-goods ratio is advantageously in the range of from 60:1 to 10:1, preferably 40:1 to 12:1; shorter liquor-to-goods ratios, in particular in the range of from 12:1 to 2:1, occur principally in the winch-becks and jet-dyeing machines. As impregnation processes come e.g. into consideration those in which the impregnated goods, after imbibing with the liquor, are allowed to batch, e.g. at temperatures in the range of 20° to 80° C.

The liquors contain a quantity of sodium chloride as suitable for the respective dyeing process and which is of at least 20 g/l, preferably $\geq$50 g/l, more preferably $\geq$60 g/l, in particular in the range of from 50 to 200 g/l, principally 60 to 150 g/l, preferably 70 to 140 g/l. The sodium chloride is advantageously preset in the form of brine (aqueous, nearly to completely saturated sodium chloride solution) and then diluted with water to the desired liquor-to-goods ratio or it is given into the preset water; the auxiliary (E) is advantageously added to the preset, salt-containing liquor before the dye addition and preferably also before the addition of the substrate to be dyed. An inadvertently too early addition of the auxiliary (E) into the not yet diluted brine has no negative consequences, due to the high stability of (E) to sodium chloride, since a subsequent addition of water gives also a faultless liquor.

For exhaustion dyeings the goods to be dyed are suitably given into the liquor before addition of the dye. After preparing the liquor, adding the substrate and finally the reactive dye, the exhaustion dyeing may be carried out in a manner conventional per se. If desired, further dyeing auxiliaries, as corresponding to the chosen processes and substrates, may be added to the liquor, e.g. wetting agents, dispersants, sequestering agents and/or process-specific auxiliaries (e.g. lubricants or defoamers). The dyeing may be carried out under conditions conventional per se, e.g. in the temperature range of from 10° C. to the boil, advantageously 20° to 100° C., and is expediently carried out in two stages or "phases": first a take-up phase and subsequently a fixation phase. According to a process variant the process is carried out at elevated temperature, in particular at temperatures $\geq$60° C., principally in the range of 70° to 100° C. The pH of the liquor at the beginning (i.e. in the dye-take-up phase) may vary in the nearly neutral to weakly alkaline range, e.g. in the range from pH 6 to 9, preferably 6.5 to 8.5, in particular 6.5 to 8; for fixation of the reactive dye on the fibre, at the end of the take-up phase [i.e. when the dye has been adsorbed on the substrate up to the desired degree, that is, when the take-up phase is (nearly) completed] a suitable base, principally alkali metal hydroxide or carbonate, with particular preference sodium hydroxide, sodium carbonate or potassium hydroxide, is added and fixation is carried out e.g. at pH-values in the range of from 8 to 12.5, preferably 9 to 12. The take-up phase may be carried out in conventional time ranges as are suitable for the respective method and substrate as well as dye and dyeing parameters, in exhaustion processes unter non-forced conditions (e.g. in the jigger, in the dyeing-drum, by flooding or in the winch-beck, or by any further exhaustion method, preferably with the exception of jet-dyeing processes) e.g. in the range of from 15 minutes to 2 hours, principally 20 minutes to 1 hour; in the dye-jet (jet-dyeing machine) shorter times may also be sufficient, e.g. 5 to 40 minutes, principally 7 to 25 minutes. The addition of alkali for dye fixation takes place advantageously by portions, after which the process may be continued for some time, e.g. for 5 to 60 minutes. For highly reactive dyes—so-called "cold dyers"—fixation may also take place at lower temperature, principally in the temperature range of from 10° to 60° C., preferably 15° to 50° C. With particular advantage the take-up phase and the fixation phase are carried out in this case at the same temperature. According to a further variant, which is suitable for less reactive and less substantive reactive dyes, the alkali may also be added at the beginning, the dyeing proceeding being directed by temperature regulation; the take-up phase takes place in this case mainly at temperatures below 80° C. and fixation takes then place by heating to temperatures $\geq$80° C., preferably in the range of 90° to 100° C. Conclusively the dyed substrate may be finished-off in conventional way (by soaping, rinsing and drying). There may also be dyed fibre blends, e.g. mixtures with synthetic fibres, which may be treated in the same liquor with disperse dyes.

In impregnation processes, the goods may be impregnated with the salt-containing and dyestuff-containing liquor, then batched and thereafter subjected to a fixing alkali treatment and finished-off as conventional.

By the process of the invention there may be produced with reactive dyes (R) very level reactive dyeings, even when using very high sodium chloride concentrations, which renders possible a maximum dye exhaustion from the liquor. Even operational mistakes in the setting of the liquor have, as stated above, no negative consequences.

The auxiliaries ($E_1$) and ($E_2$) of the invention may also be employed in dyeing processes for the dyeing with reactive dyes, in which there are used sodium sulphate or other salts (e.g. sodium silicate or sodium phosphate).

The auxiliaries (E) may contain a proportion of sulphates as by-product from their production, e.g. in the form of ammonium sulphate or alkali metal sulphate (depending on the employed base); the proportion of these salts is, however, small in relation to the employed liquor and not disturbing. It may range e.g. up to 20% by weight of (E), preferably in the scope of 1 to 10% by weight of (E), depending on the employed synthetic process.

In the following examples parts and percentages are by weight; the temperatures are indicated in degrees Celsius. The dyes employed in the application examples are employed in their commercial form which is blended with sodium sulphate and sodium carbonate; the indicated dye amounts refer to pure dye. "C.I." stands for "Colour Index". The employed diisopropylnaphthalene is a commercial isomers mixture (KMC of RÜTTGER'S WERKE AG., DUISBURG, Germany); the employed ditolylether is a commercial isomers mixture containing the positional isomers 2,2', 2,3', 2,4', 3,4' and 4,4'; "SHELLSOL AB" is a commercial technical $C_{9-11}$-aromatics mixture consisting to about 20% by weight of $C_9$-aromatics (alkylbenzenes and indane), to about 70% by weight of $C_{10}$-aromatics (alkylbenzenes, methylindanes and naphthalene) and to about 10% by weight of $C_{11}$-aromatics, in which naphthalene amounts to about 5.37% by weight.

EXAMPLE 1

In a fivenecked sulphation flask of 1500 ml capaciy fitted with a reflux refrigerator, 64 g of naphthalene and 99 g of ditolylether are admixed and heated to 75° C. inner temperature under a nitrogen blanket. 176.4 g of 100% sulphuric acid are added dropwise thereto over 1 hour, with good stirring. After completion of the sulphuric acid addition the reaction mixture is heated to 143°–145° C. inner temperature and stirred during 7 hours at this temperature. After this time the obtained product displays an acid content of 645 to 660 mval/100 g. Then it is cooled to 60° C. and 20 parts of demineralized water are added thereto during 15 minutes. Subsequently 40.5 g of aqueous 35% formaldehyde are added dropwise during 25 to 30 minutes in such a way that the inner temperature does not exceed 85° C. After completion of the addition the inner temperature is raised to 91°–92° C. and stirring is continued for 1 to 1½ hour at this temperature. Then the product is cooled to 80°–85° C. and diluted with a mixture of 120 ml of demineralized water and 120 g of ice, by which the temperature decreases to 40°–45° C. The obtained clear, light brown solution is now additioned dropwise with 179 g of aqueous 25% ammonia and the pH value is adjusted to 7.5–8.2, while the temperature is maintained between 40° and 25° C. Upon further dilution with 109.1 g of demineralized water there are obtained 928 g of aqueous product of about 42% dry substance content.

EXAMPLE 2

The procedure described in Example 1 is repeated, with the difference that instead of 64 g of naphthalene there are employed 85 g of naphthalene.

EXAMPLE 3

The procedure described in Example 1 is repeated, with the difference that instead of 176.4 g of 100% sulphuric acid there are employed 196 g of 100% sulphuric acid.

EXAMPLE 4

The procedure described in Example 1 is repeated, with the difference that instead of 176.4 g of 100% sulphuric acid there are employed 205.8 g of 100% sulphuric acid.

EXAMPLE 5

The procedure described in Example 1 is repeated, with the difference that instead of 64 g of naphthalene there are employed 71 g of a technical grade methyl naphthalene (mixture of 1- and 2-positional isomers).

EXAMPLE 6

The procedure described in Example 1 is repeated, with the difference that instead of 64 g of naphthalene there are employed 67 g of "SHELLSOL AB".

EXAMPLE 7

The procedure described in Example 6 is repeated, with the difference that instead of 176.4 g of 100% sulphuric acid there are employed 196 g of 100% sulphuric acid.

EXAMPLE 8

The procedure described in Example 6 is repeated, with the difference that instead of 176.4 g of 100% sulphuric acid there are employed 147 g of 100% sulphuric acid and instead of 0.53 moles of formaldehyde, there are employed 0.4 moles of formaldehyde.

EXAMPLE 9

The procedure described in Example 3 is repeated, with the difference that first naphthalene alone is sulphonated with 98 g of 100% sulphuric acid and after three hours of sulphonation the temperature is lowered to 80° C. and at this temperature the ditolylether and the remaining 98 g of 100% sulphuric acid are added, after which the temperature is again raised to 143°–145° C. and the sulphonation of the mixture is continued until reaching the same acid content as in Example 3.

EXAMPLE 10

The procedure described in Example 3 is repeated, with the difference that naphthalene alone is preset and after 2 hours of sulphonation the temperature is lowered to 80° C., the ditolylether is added, upon which the temperature is again raised to 143°–145° C. and sulphonation is continued until reaching the same acid content as in Example 3.

EXAMPLE 11

The procedure described in Example 1 is repeated, with the difference that instead of 0.53 moles of formaldehyde, 0.35 moles thereof are employed.

EXAMPLE 12

The procedure described in Example 1 is repeated, with the difference that instead of 0.53 moles of formaldehyde there are employed 0.45 moles thereof.

EXAMPLE 13

96.5 g of diisopropylnaphthalene and 90 g of ditolylether are preset in a five-necked sulphonation flask of 1500 ml capacity, which is fitted with a reflux refrigerator. 133.6 g of 100% sulphuric acid are added thereto under a nitrogen blanket, during 30 minutes, with good stirring, so that the temperature increases to 85°–90° C. The mixture is then heated within 30 minutes to 110° C. and stirring is continued for 2½ hours. Then the temperature is lowered to 95° C. and 74 g of water and 38.9 g of aqueous 37% formaldehyde solution are added in such a way that the temperature does not exceed 90° C. After completion of the addition, stirring is continued for two hours at 85°14 90° C., 148.5 g of water are added and the temperature is lowered to 50° C. At this temperature 146 g of aqueous 25% ammonia solution and 110 g of water are added. The pH settles at 7.5–7.7. There are obtained 837.5 g of a solution with about 40% dry substance content.

EXAMPLE 14

147 parts of 100% sulphuric acid are added during 25 minutes, at 75° C., under a nitrogen blanket, into a mixture of 106 parts of diisopropylnaphthalene and 99 parts of ditolylether, by which the temperature increases to 80°–85° C. The reaction mixture is then heated to 105° C. and stirring is continued until a sample is hydrosoluble, which takes place after about two hours. Thereafter the reaction mixture is cooled to 80° C. and 43 parts of aqueous 37% formaldehyde are added thereto during 15 minutes, the temperature being maintained at 25° C. by external cooling. After completion of the addition 25 parts of water are added thereto and the mixture is heated to an inner temperature of 95°–97° C. and stirring is continued until the reaction of formaldehyde has completed, which lasts about two hours. After cooling the reaction mixture to 80° C., 275 parts of water/ice-mixture are added and the reaction mixture is cooled to 30° C. At this temperature 157 parts of aqueous 25% ammonia are added (pH=7.5–8) and finally 231 parts of demineralized water are stirred into the mixture. There are obtained 1083 parts of a solution with 34.53% dry substance content.

Composition I

To the aqueous product of Example 1 (928g) are added sequentially, with stirring, the following components: 26.8 g of urea, after 30 minutes 15.2 g of sodium polyacrylate (average molecular weight 5000), followed by 24.8 g of diethylenetriaminepentamethylphosphonic acid sodium salt and after one hour 40.4 g of borax, after which stirring is continued for a further hour. There are obtained 1035.2 g of a stable, readily dilutable composition.

Compositions II to XIV

The procedure described for Composition I is repeated, with the difference that instead of the product of Example 1 there are employed the products of each of the Examples 2 to 14.

The procedure described in Example 1 is repeated and the obtained product is then dried in a spray-drier. The obtained dry product is readily dilutable with water.

The products of Examples 2 to 14 are dried in analogous way.

Application Example A

Into 1800 parts of an aqueous liquor containing 2 parts of Composition I and 140 parts of common salt (sodium chloride) and which is heated to 80° C., are introduced 100 parts of cotton fabric. A solution of 1 part of C.I. Reactive Blue 52 in 100 parts of water is added to the liquor, which is then heated to 90° C. After 30 minutes at this temperature follow 5 additions of 10 parts each of aqueous 3% sodium hydroxide solution at intervals of 5 minutes between each addition, after which dyeing is continued at 90° C. for further 40 minutes. Then the bath is cooled and the dyeing is finished-off in conventional way (soaped, rinsed and dried). There is obtained a very level, pure, reproducible, blue dyeing in high yield.

Application Example B

The procedure described in Application Example A is repeated with the difference that instead of 1 part of C.I. Reactive Blue 52 there is employed the same amount of C.I. Reactive Yellow 165. There is obtained a perfectly level and reproducible yellow dyeing in high purity and yield.

Application Example C

Into 1500 parts of an aqueous liquor containing 120 parts of common salt, 30 parts of calcined soda (sodium carbonate), 1.5 parts of sodium nitrobenzenesulphonate and 2 parts of Composition I are introduced 100 parts of pre-wetted and bleached cotton jersey. After heating of the liquor to 60° C., a solution of 3 parts of C.I. Reactive Blue 214 in 100 parts of water is added to the liquor. The liquor is heated within 30 minutes to 90°–98° C. and maintained at this temperature for further 60 minutes. Then the dyeing is finished-off in conventional way. There is obtained a very level, dark blue dyeing and a very regular, uniform aspect of the goods.

Application Example D

Into 1500 parts of an aqueous liquor containing 150 parts of common salt, 1.5 parts of sodium nitrobenzenesulphonate and 2 parts of Composition I and which is heated to 80° C., are introduced 100 parts of pre-wetted and bleached regenerated cotton fibre. The liquor is then heated to 85° C. and a solution of 2.5 parts of C.I. Reactive Violet 33 in 50 parts of water is added thereto. After 30 minutes are added at intervals of 10 minutes between each addition 10 parts, 30 parts and finally 200 parts of aqueous 10% sodium hydroxide solution, after which dyeing is continued for further 40 minutes at this temperature. Then the dyeing is finished-off in conventional way. There is obtained a very level, reproducible, violet dyeing.

Application Example E

Into 2000 parts of an aqueous liquor containing 140 parts of common salt and 3 parts of Composition I are introduced at 30° C. 250 parts of bleached, mercerized cotton fabric and wetted for 10 minutes. After 10 minutes a solution of 5.6 parts of C.I. Reactive Red 159 in 150 parts of water is added. After 15 minutes at this temperature are added 4 pards of calcined soda. At intervals of 10 minutes between each addition are then added 3 parts of 30% sodium hydroxide solution in 30 parts of water, 1 part of 30% sodium hydroxide solution in 10 parts of water and finally 3 parts of 30% sodium hydroxide solution in 30 parts of water. Dyeing is then continued for further 40 minutes and then the dyeing is finished-off in conventional way. There is obtained a very level, readily reproducible, brilliant red dyeing.

Application Example F

Into 1500 parts of an aqueous liquor containing 140 parts of common salt, 3 parts of calcined soda and 2 parts of Composition I are introduced 100 parts of pre-wetted, bleached cotton jersey. At 20° C. a solution of 3.15 parts of C.I. Reactive Blue 116 in 50 parts of water is added to the liquor, which is then heated during 30 minutes to 50° C. After 20 minutes 3 parts of aqueous 30% sodium hydroxide in 30 parts of water are added and fixation is carried out for 60 minutes at the same temperature. Then the dyeing is finished-off in conventional way. There is obtained a very level, turquoise blue dyeing and a very regular and uniform aspect of the goods.

Analogously as Composition I each one of Compositions II to XIV is employed in each of the above Application Examples A to F.

Instead of Compositions I to XIV in the above Application Examples A to F the products of the respective Examples 1 to 14 may be given into the dye liquor, while the remaining components of the Compositions I to XIV (urea, sodium polyacrylate, diethylenetriaminopentamethylphosphonic acid sodium salt and borax) are added to the liquor, each separately or jointly in the form of a concentrated aqueous composition (dry substance content 35% before the introduction of the cotton.

I claim:

1. In a process for the exhaust dyeing of cellulose-containing substrates with reactive dyes (R) in aqueous liquor containing 20–200 g/L sodium chloride; and the optional presence of a sequestering agent (Q), a hydrotrope (H), or a mixture of (Q) and (H); the improvement comprising the dyeing being carried out in the presence of 0.05–5 g per liter aqueous liquor of an auxiliary (E), (E) being a methylene-bridge-containing and sulpho-group-containing aromatic product or mixture of products, optionally in salt form, that is obtainable by sulphonation of (a) a compound of formula

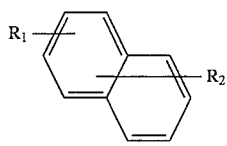

to introduce on average at least 1.1 sulpho groups per molecule of (a),
and of (b) at least one optionally alkylsubstituted diphenyl(thio)ether, to introduce on average at least 1.1 sulpho groups per molecule of (b), and condensation of the sulphonation products of (a) and of (b) with (c) formaldehyde or a formaldehyde-yielding compound in acidic medium and optionally, followed by reaction with a base to form a salt, wherein $R_1$ and $R_2$ are independently hydrogen or alkyl of 1 to 4 carbon atoms.

2. A process according to claim 1, wherein the diphenyl(thio)ether is

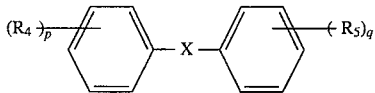

wherein

X signifies oxygen or sulphur, $R_4$ and $R_5$ signify each, independently, $C_{1-4}$-alkyl
and p and q signify each, independently, 0, 1 or 2.

3. A process according to claim 1, wherein the molar ratio (c)/[(a)+(b)] is chosen so that there are formed simple to oligomeric condensates.

4. A process according to claim 1, wherein the base used to form the salt provides alkali metal cations or ammonium cations.

5. A process according to claim 1, which is carried out in the presence of a sequestering agent (Q) or a hydrotrope (H) or both.

6. A process according to claim 1, in which the sulphonation in step (a) introduces 1.1 to 2, sulpho groups per molecule of (a).

7. A process of claim 5, in which the sulphonation of (a) introduces 1.4 to 1.8 sulpho groups per molecule of (a).

8. A process according to claim 5, wherein (Q) is ($Q_1$) an alkali metal tetraborate, ($Q_2$) a (co)poly(meth)acrylic acid, optionally in salt form, ($Q_3$) a N-methylene-phosphonic or -carboxylic acid, optionally in salt form, or ($Q_4$) a polyhydroxycarboxylic acid, optionally in salt form, or a mixture of two or more of these compounds.

9. A process according to claim 5, wherein (H) is ($H_1$)(thio)urea, ($H_2$) an aliphatic $C_{3-6}$-polyol with at least 3 hydroxy groups or an acetic acid partial ester thereof, ($H_3$) a mono- or oligo-($C_{2-4}$-alkylene)-glycol or a mono-($C_{1-4}$-alkyl)-ether thereof, ($H_4$)dicyanodiamide, or ($H_5$) an aliphatic lactone or N-alkyl-lactame, or a mixture of two or more of these compounds.

10. A process according to claim 1, wherein (E) is employed in a concentration of 0.1 to 2 grams of (E) per liter of aqueous liquor.

* * * * *